United States Patent
Takahashi (10) Patent No.: US 7,221,635 B2
(45) Date of Patent: May 22, 2007

(54) INFORMATION DISK DEVICE AND METHOD FOR DETECTING DIRECTION OF INSTALLED INFORMATION DISK DEVICE

(75) Inventor: Yorio Takahashi, Onsen-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 692 days.

(21) Appl. No.: 10/275,752

(22) PCT Filed: Feb. 14, 2002

(86) PCT No.: PCT/JP02/01232

§ 371 (c)(1),
(2), (4) Date: Nov. 8, 2002

(87) PCT Pub. No.: WO02/080154

PCT Pub. Date: Oct. 10, 2002

(65) Prior Publication Data

US 2003/0090979 A1 May 15, 2003

(30) Foreign Application Priority Data

Mar. 28, 2001 (JP) ............................ 2001-092882

(51) Int. Cl.
*G11B 7/085* (2006.01)

(52) U.S. Cl. ................................. 369/53.28; 369/44.32

(58) Field of Classification Search .................. 360/69, 360/71, 44.32, 53.14, 53.18, 53.19, 53.28
See application file for complete search history.

(56) References Cited

U.S. PATENT DOCUMENTS

| 5,003,415 | A | | 3/1991 | Freeze |
| 5,048,001 | A | * | 9/1991 | Moriya et al. ............ 369/44.32 |
| 5,220,547 | A | * | 6/1993 | Yasukawa et al. ........ 369/44.28 |
| 5,249,168 | A | * | 9/1993 | Kagami et al. ........... 369/53.28 |
| 5,278,813 | A | | 1/1994 | Ohnishi et al. |
| 6,181,651 | B1 | | 1/2001 | Kishimoto et al. |
| 6,954,414 | B2 | * | 10/2005 | Nishimura et al. ....... 369/53.35 |

FOREIGN PATENT DOCUMENTS

| JP | 02073529 A | * | 3/1990 |
| JP | 02113436 A | * | 4/1990 |
| JP | 4-44643 | | 2/1992 |
| JP | 6-20291 | | 1/1994 |
| JP | 9-120634 | | 5/1997 |
| JP | 10-149547 | | 6/1998 |
| JP | 10-255287 | | 9/1998 |
| JP | 2001-35101 | | 2/2001 |
| JP | 2001-60327 | | 3/2001 |

OTHER PUBLICATIONS

PAJ Abstract and machine translation of JP 2001-060327.*

* cited by examiner

*Primary Examiner*—Wayne Young
*Assistant Examiner*—Nathan Danielsen
(74) *Attorney, Agent, or Firm*—Wenderoth, Lind & Ponack, L.L.P.

(57) ABSTRACT

The direction in which an information disk apparatus (for example, a DVD-ROM player) is installed is judged without employing a sensor. A controller measures a number of track crossings when a reading unit is moved by a driving unit in a direction corresponding to the radius of an optical disk for a predetermined period of time, and judges a direction in which the DVD-ROM player is installed on the basis of the measured number of track crossings.

10 Claims, 7 Drawing Sheets

INFORMATION DISK DEVICE AND METHOD FOR DETECTING DIRECTION OF INSTALLED INFORMATION DISK DEVICE

TECHNICAL FIELD

The present invention relates to an information disk apparatus and a method for detecting a direction in which the information disk apparatus is installed and, more particularly, to an improved method for detecting a direction in which a device for recording or reproducing a signal in/from a disk-shaped information recording medium is installed.

BACKGROUND ART

In recent years, there is a demand that computer devices such as a personal computer and a game machine have a variety of designs and, accordingly, it is supposed that information disk apparatuses mounted on these computer devices are installed in various directions.

It is known that the information disk apparatus is required to detect an installing direction thereof and change various kinds of control parameters according to the installing direction, thereby to perform high-speed recording/reproduction, enhance the accuracy of the recording/reproduction, increase a speed for seeking a target information track or the like.

Accordingly, there is generally adopted a method of preparing firmware in which an optimum control parameter is previously set for each installing direction, or a method of setting information according to the installing direction through an external jumper setting, switching means or the like, to set an optimum parameter.

Further, according to a method as described in Japanese Published Patent Application No. Hei.10-255287, an object lens, a pickup device which supports the object lens so that it is movable at least in the tracking direction, a pickup carrier member for carrying the pickup device, a tracking control circuit for driving the object lens in the direction perpendicular to tracks, a traverse control circuit for driving the pickup carrier member in the direction perpendicular to the tracks, a position detector for detecting the initial posture of the object lens with respect to the pickup, and a compensation circuit which supplies a compensation signal according to the output from the position detector to the tracking control circuit and the traverse control circuit are included, whereby tracking control and traverse control can be performed in an optimum state at all times, independently of an installed state of a device.

Further, there a method is also known in which a sensor means that detects the direction in which a disk drive is set is provided in a device, thereby to detect the direction in which the device is installed.

However, in the method of preparing firmware in which an optimum control parameter is previously set for each installing direction, and the method of setting an installing direction through the external jumper setting, switching means or the like, a user is required to change the setting of the installing direction every time the user changes the direction in which a computer device is installed. Accordingly, when an erroneous setting is performed, the information disk apparatus fails to achieve its original performance.

Also, in the method disclosed in the Japanese Published Patent Application No. Hei.10-255287, since a positional relationship between the object lens and the pickup is detected, an error is easily generated due to variations in traverse loads, and in a device having a mechanism with the object lens whose weight is significantly reduced, an amount of displacement of the object lens, which is caused by gravity, is small and, thus, an accurate installing direction is not always detected. Moreover, in the method employing an installing direction detection means, the sensor means increases the cost of the device and a space needed for installing the sensor means in the device becomes a problem.

The present invention is made to solve the above-described conventional problems and has for its object to provide an information disk apparatus and an information disk apparatus installing direction detection method, which enable accurate detection of the installing direction at all times without employing a sensor means and with no increase in the costs.

SUMMARY OF THE INVENTION

To solve the above-mentioned problems, according to a first aspect of the present invention, there is provided an information disk apparatus which records or reproduces information in/from an information disk on which information tracks are formed spirally or concentrically comprising: a control means for: controlling a driving means so that it reciprocates a reading means for reading the information from the drivingly rotating information disk, in a direction corresponding to the radius of the information disk, calculating the number of track crossing times that the information tracks are crossed by the locus for the reciprocation, on the basis of the information read by the information reading means at the reciprocation, and judging a direction in which the information disk apparatus is installed on the basis of the calculation result. Therefore, the installing direction is detected on the basis of the number of track crossings when the reading means is moved in the radius direction, whereby no additional sensor, circuit or the like is required, and the direction in which the information disk apparatus is installed can be accurately detected at all times.

According to a second embodiment of the present invention, in the information disk apparatus as defined in the first embodiment, the information disk is an optical disk, the information reading means is an optical pickup, and the control means controls the optical pickup to focus on an information recording surface of the optical disk at the information reading. Therefore, the installing direction is detected on the basis of the number of track crossings when the reading means is moved in the radius direction in a focus-on state, whereby no additional sensor, circuit or the like is required, and the direction in which the information disk apparatus is installed can be accurately detected at all times.

According to a third aspect of the present invention, in the information disk apparatus as defined in the second aspect, the control means stops a tracking drive by the optical pickup at the information reading. Therefore, the installing direction is detected on the basis of the number of track crossings when the reading means is moved in the radius direction in a state where the focus is on and the tracking drive is stopped, whereby no additional sensor, circuit or the like is required, and the direction in which the information disk apparatus is installed can be accurately detected at all times.

According to a fourth aspect of the present invention, there is provided an information disk apparatus which records or reproduces information in/from an information disk on which information tracks are formed spirally or concentrically, comprising: a disk rotation means for rotating the information disk; a reading means for reading a signal from the information disk; a driving means for driving the reading means in a direction corresponding to the radius of the information disk; a track crossing signal generation means for generating an information track crossing signal of the information disk from a reproduction signal from the reading means; and a control means for controlling the disk rotation means, the reading means, the driving means, and the track crossing signal generation means, in which the control means drives the reading means in the direction corresponding to the radius of the information disk for a predetermined period of time by means of the driving means, while counting the information track crossing signal generated by the track crossing signal generation means, and detects a direction in which the information disk apparatus is installed on the basis of the obtained count value. Therefore, the installing direction is detected on the basis of a track crossing count value when the reading means is moved in the radius direction for a predetermined period of time, whereby no additional sensor, circuit or the like is required, and the direction in which the information disk apparatus is installed can be accurately detected at all times.

According to a fifth aspect of the present invention, the information disk apparatus as defined in the fourth aspect, which is able to reproduce or record information from/in plural types of information disks having different track pitches, further comprises: a track pitch detecting means for detecting a track pitch of the information disk, in which the control means moves the reading means in a direction corresponding to the radius of the information disk for a predetermined period of time at a predetermined speed, by means of the driving means, while counting the information track crossing signal generated by the track crossing signal generation means, and detects the direction in which the information disk apparatus is installed on the basis of the obtained count value and track pitch of the information disk. Therefore, the installing direction is detected on the basis of a track crossing count value when the reading means is moved in the radius direction for a predetermined period of time, whereby no additional sensor, circuit or the like is required, and the direction in which the information disk apparatus is set can be accurately detected at all times.

According to a sixth aspect of the present invention, the information disk apparatus as defined in the fifth aspect further comprises: a table which indicates standard track pitch values for respective types of the information disks, in which the track pitch detection means detects the type of the information disk, and refers to the table of track pitch values, thereby detecting the track pitch of the information disk. Therefore, the installing direction is detected on the basis of a track crossing count value when the reading means is moved in the radius direction for a predetermined period of time, whereby no additional sensor, circuit or the like is required, and the direction in which the information disk apparatus is installed can be accurately detected at all times.

According to a seventh aspect of the present invention, in the information disk apparatus as defined in the fifth aspect, the track pitch detection means has a linear speed detection means for detecting a linear speed of the information disk; and a reproduction speed detection means for detecting a current reproduction speed of the information disk, and detects the type of the information disk, and the control means detects a linear speed of the disk by employing the linear speed detection means, rotates the information disk which is mounted on the disk rotation means at a prescribed speed, moves the reading means to a position corresponding to a prescribed address on the information disk (hereinafter, referred to simply as an "address") by means of the driving means, detects a reproduction speed at the prescribed rotational speed and at the prescribed address, by employing the reproduction speed detection means, and calculates the track pitch of the information disk on the basis of the linear speed of the information disk which is detected by the linear speed detection means, the reproduction speed detected at the prescribed rotational speed and address, the prescribed rotational speed, the address value, an innermost circumference diameter of a data area which is inherent in the detected type of the information disk, and a data rate value in a case of reproduction at a prescribed reproduction speed which is inherent in the detected type of the information disk. Therefore, the installing direction is detected on the basis of a track crossing count value when the reading means is moved in the radius direction for a predetermined period of time, whereby no additional sensor, circuit or the like is required, and the direction in which the information disk apparatus is installed can be accurately detected at all times.

According to an eighth aspect of the present invention, in the information disk apparatus as defined in the fifth aspect, the control means compares the obtained count value with a threshold value, thereby detecting the direction in which the information disk apparatus is installed. Therefore, the installing direction is detected on the basis of a track crossing count value when the reading means is moved in the radius direction for a predetermined period of time, whereby no additional sensor, circuit or the like is required, and the direction in which the information disk apparatus is installed can be accurately detected at all times.

According to a ninth aspect of the present invention, there is provided an information disk apparatus which records or reproduces information in/from an information disk on which information tracks are formed spirally or concentrically, comprising: a disk rotation means for rotating the information disk; a reading means for reading a signal from the information disk; a driving means for driving the reading means in a direction corresponding to the radius of the information disk; a track crossing signal generation means for generating a information track crossing signal of the information disk from a reproduction signal from the reading means; and a control means for controlling the disk rotation means, the reading means, the driving means, and the track crossing signal generation means, in which the control means reciprocates the reading means in the direction corresponding to the radius of the information disk for a predetermined period of time by means of the driving means, while counting the information track crossing signal generated by the track crossing signal generation means, and detects a direction in which the information disk apparatus is installed on the basis of the count values obtained for the reciprocation. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to a tenth aspect of the present invention, in the information disk apparatus as defined in the ninth aspect, the direction in which the information disk apparatus is installed is detected on the basis of a difference between a count value for a forward path and a count value for a backward path in the count values for the reciprocation. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to an eleventh aspect of the present invention, in the information disk apparatus as defined in the ninth aspect, the direction in which the information disk apparatus is installed is detected on the basis of a ratio between a count value for a forward path and a count value for a backward path in the count values for the reciprocation. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to the twelfth aspect of the present invention, the information disk apparatus as defined in the ninth aspect, which is able to reproduce or record information from/in plural types of information disks having different track pitches, further comprises: a track pitch detecting means for detecting a track pitch of the information disk, in which the control means reciprocates the reading means in the direction corresponding to the radius of the information disk for a predetermined period of time by means of the driving means, while counting the information track crossing signal generated by the track crossing signal generation means, and detects the direction in which the information disk apparatus is installed on the basis of the obtained count values for the reciprocation and track pitch of the information disk. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to a thirteenth aspect of the present invention, in the information disk apparatus as defined in the ninth aspect, the control means compares the obtained count values for the reciprocation with a threshold value, thereby detecting the direction in which the information disk apparatus is installed. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to a fourteenth aspect of the present invention, the information disk apparatus as defined in fourth or ninth aspect further comprises a rotational speed detection means for detecting a rotational speed of the information disk, in which the time for which the reading means is moved by the driving means is an integer multiple of a time required for one rotation which is detected by the rotational speed detection means. Therefore, the reading means is moved according to a disk rotation cycle so that the reading means is located at the same rotational position at start and end of the movement, whereby even when there is significant eccentricity between the information disk and the disk rotation means or vibrations, an influence on track crossing due to the eccentricity or vibrations is countervailed, and thus the direction in which the information disk apparatus is installed is accurately detected at all times.

According to a fifteenth aspect of the present invention, in the information disk apparatus as defined in any of the first, fourth, tenth and eleventh aspects, the driving means is set so that it can be driven with an inclination with respect to the gravity direction in at least one of directions in which the information disk apparatus is installed, the reading means is reciprocated by the driving means in the radial direction for a predetermined period of time, from an inner circumference of the information disk toward an outer circumference as well as from an outer circumference toward an inner circumference, while the track crossing signal generated by the track crossing signal generation means is counted, and the direction in which the information disk apparatus is installed is detected on the basis of the obtained count value. Therefore, it is possible to provide an information disk apparatus which is able to judge a direction in which the reading means is driven as one of three directions, i.e., upward and downward directions when the information disk apparatus is installed vertically and the information disk is ejected in the lateral direction, and the horizontal direction when the information disk apparatus is installed horizontally.

According to a sixteenth aspect of the present invention, in the information disk apparatus as defined in the fifteenth aspect, the inclination with respect to the gravity direction is between 15° and 75° or 105° and 165°. Therefore, it is possible to provide an information disk apparatus which enables to judge a direction in which the reading means is driven as one of three directions, i.e., upward and downward directions when the information disk apparatus is installed vertically and the information disk is ejected in the lateral direction, and the horizontal direction when the information disk apparatus is installed horizontally.

According to a seventeenth aspect of the present invention, in the information disk apparatus as defined in a fifteenth aspect, the inclination with respect to the gravity direction is not approximately equal to any of 45°, 90°, 135°, and 180°. Therefore, it is possible to provide an information disk apparatus which enables to judge a direction in which the reading means is driven as one of five directions, i.e., upward and downward directions when the information disk apparatus is installed vertically and the information disk is ejected in the lateral direction, upward and downward directions when the information disk apparatus is installed vertically and the information disk is ejected in the vertical direction, and a horizontal direction when the information disk apparatus is installed horizontally.

According to an eighteenth aspect of the present invention, in the information disk apparatus as defined in the fifteenth aspect, the inclination with respect to the gravity direction is between 15° and 30°, 60° and 75°, 105° and 120°, or 150° and 165°. Therefore, it is possible to provide an information disk apparatus which enables to judge a direction in which the reading means is driven as one of five directions, i.e., upward and downward directions when the information disk apparatus is installed vertically and the information disk is ejected in the lateral direction, upward and downward directions when the information disk apparatus is installed vertically and the information disk is ejected in the vertical direction, and a horizontal direction when the information disk apparatus is installed horizontally.

According to a nineteenth aspect of the present invention, there is provided a method for detecting a direction in which an information disk apparatus that records or reproduces information in/from an information disk on which information tracks are formed spirally or concentrically is installed, comprising: reciprocating a reading means for reading the information from the drivingly rotating information disk, in a direction corresponding to the radius of the information disk; and obtaining the number of track crossing times that the information tracks are crossed by the locus for the reciprocation, on the basis of the information read by the reading means at the reciprocation, thereby judging the direction in which the information disk apparatus is installed. Therefore, the installing direction is detected on the basis of the number of track crossings when the reading means is moved in the radius direction, whereby no additional sensor, circuit or the like is required, and the direction in which the information disk apparatus is installed can be accurately detected at all times.

According to a twentieth aspect of the present invention, in the information disk apparatus installing direction detection method as defined in the nineteenth aspect, the information disk is an optical disk, the information reading means is an optical pickup, and a control means controls the optical pickup to focus on an information recording surface of the optical disk, at the information reading. Therefore, the installing direction is detected on the basis of the number of track crossings when the reading means is moved in the radius direction in a focus-on state, whereby no additional sensor, circuit or the like is required, and the direction in which the information disk apparatus is installed can be accurately detected at all times.

According to a twenty-first aspect of the present invention, in the information disk apparatus installing direction detection method as defined in the twentieth aspect, the control means stops a tracking drive by the optical pickup at the information reading. Therefore, the installing direction is detected on the basis of the number of track crossings when the reading means is moved in the radius direction in a state where the focus is on and the tracking drive is stopped, whereby no additional sensor, circuit or the like is required, and the direction in which the information disk apparatus is installed can be accurately detected at all times.

According to a twenty-second aspect of the present invention, there is provided a method for detecting a direction in which an information disk apparatus that records or reproduces information in/from an information disk on which information tracks are formed spirally or concentrically is installed, comprising: generating an information track crossing signal of the information disk from a reproduction signal which is obtained from the information disk by a reading means; moving the reading means by a driving means in a direction corresponding to the radius of the information disk, for a predetermined period of time, while counting the information track crossing signal; and detecting the direction in which the information disk apparatus is installed, on the basis of the obtained count value. Therefore, the installing direction is detected on the basis of a track crossing count value when the reading means is moved in the radius direction for a predetermined period of time, whereby no additional sensor, circuit or the like is required, and the direction in which the information disk apparatus is installed can be accurately detected at all times.

According to a twenty-third aspect of the present invention, in the information disk apparatus installing direction detection method as defined in the twenty-second aspect, the information disk apparatus is able to reproduce or record information from/in plural types of information disks having different track pitches, a track pitch of the information disk is detected by a track pitch detection means, the reading means is moved by the driving means, in the direction corresponding to the radius of the information disk, for a predetermined period of time at a predetermined speed, while the information track crossing signal is counted, and the direction in which the information disk apparatus is installed is detected on the basis of the obtained count value and track pitch of the information disk. Therefore, the installing direction is detected on the basis of a track crossing count value when the reading means is moved in the radius direction for a predetermined period of time, whereby no additional sensor, circuit or the like is required, and the direction in which the information disk apparatus is installed can be accurately detected at all times.

According to a twenty-fourth aspect of the present invention, in the information disk apparatus installing direction detection method as defined in the twenty-third aspect, a table which indicates track pitch standard values for respective types of the information disks is provided, and the track pitch detection means detects the type of the information disk, and refers to the table of the track pitch values, thereby detecting the track pitch of the information disk. Therefore, the installing direction is detected on the basis of a track crossing count value when the reading means is moved in the radius direction for a predetermined period of time, whereby no additional sensor, circuit or the like is required, and the direction in which the information disk apparatus is installed can be accurately detected at all times.

According to twenty-fifth aspect of the present invention, in the information disk apparatus installing direction detection method as defined in the twenty-third aspect, the track pitch detection means has a linear speed detection means for detecting a linear speed of the information disk; and a reproduction speed detection means for detecting a current reproduction speed of the information disk, and detects the type of the information disk, the linear speed detection means detects a linear speed of the disk, the information disk mounted on the disk rotation means is rotated at a prescribed speed, the reading means is moved to a position corresponding to a prescribed address on the information disk (hereinafter, referred to simply as an "address") by the driving means, the reproduction speed detection means detects a reproduction speed at the prescribed rotational speed and at the prescribed address, and the track pitch of the information disk is calculated on the basis of the linear speed of the information disk which is detected by the linear speed detection means, the reproduction speed detected at the prescribed rotational speed and address, the prescribed rotational speed, the address value, an innermost circumference diameter of a data area which is inherent in the detected type of the information disk, and a data rate value in reproduction at a prescribed reproduction speed which is inherent in the detected type of the information disk. Therefore, the installing direction is detected on the basis of a track crossing count value when the reading means is moved in the radius direction for a predetermined period of time, whereby no additional sensor, circuit or the like is required, and the direction in which the information disk apparatus is installed can be accurately detected at all times.

According to a twenty-sixth aspect of the present invention, the information disk apparatus as defined in the twenty-second aspect comprises: comparing the obtained count value with a threshold value, thereby detecting the direction in which the information disk apparatus is installed. Therefore, the installing direction is detected on the basis of a track crossing count value when the reading means is moved in the radius direction for a predetermined period of time, whereby no additional sensor, circuit or the like is required, and the direction in which the information disk apparatus is installed can be accurately detected at all times.

According to a twenty-seventh aspect of the present invention, there is provided a method for detecting a direction in which an information disk apparatus that records or reproduces information in/from an information disk on which information tracks are formed spirally or concentrically, comprising: generating a information track crossing signal of the information disk from a reproduction signal which is obtained by a reading means from the information disk; reciprocating the reading means by a driving means in a direction of the radius of the information disk, for a predetermined period of time, while counting the information track crossing signal; and detecting the direction in which the information disk apparatus is installed, on the basis of the obtained count values for the reciprocation. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to a twenty-eighth aspect of the present invention, in the information disk apparatus installing direction detection method as defined in the twenty-seventh aspect, the direction in which the information disk apparatus is installed is detected on the basis of a difference between a count value for a forward path and a count value for a backward path in the count values for the reciprocation. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to a twenty-ninth aspect of the present invention, in the information disk apparatus installing direction detection method as defined in the twenty-seventh aspect, the direction in which the information disk apparatus is installed is detected on the basis of a ratio between a count value for a forward path and a count value for a backward path in the count values for the reciprocation. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to a thirtieth aspect of the present invention, in the information disk apparatus installing direction detection method as defined in the twenty-seventh aspect, the information disk apparatus is able to reproduce or record information from/in plural types of information disks having different track pitches, a track pitch of the information disk is detected by a track pitch detection means, the reading means is reciprocated by the driving means in the direction corresponding to the radius of the information disk, for a predetermined period of time, while the information track crossing signal is counted, and the direction in which the information disk apparatus is installed is detected on the basis of the obtained count values for the reciprocation and track pitch of the information disk. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to a thirty-first aspect of the present invention, the information disk apparatus installing direction detection method as defined in the twenty-seventh aspect comprises: comparing the obtained count values for the reciprocation with a threshold value, thereby detecting the direction in which the information disk apparatus is installed. Therefore, the installing direction is detected on the basis of a track crossing count value when the reading means is moved between the inner circumference side of the information disk and the outer circumference side for a predetermined period of time, whereby the direction in which the information disk apparatus is installed can be accurately detected at all times even when there is a wide range of variations of load on the driving means.

According to a thirty-second aspect of the present invention, in the information disk apparatus installing direction detection method as defined in the twenty-second or twenty-seventh aspect, the information disk apparatus further comprises a rotational speed detection means for detecting a rotational speed of the information disk, and the time for which the reading means is moved by the driving means is an integer multiple of a time required for one rotation which is detected by the rotational speed detection means. Therefore, the reading means is moved according to a disk rotation cycle so that the reading means is located at the same rotational position at start and end of the movement, whereby even when there is significant eccentricity between the information disk and the disk rotation means or vibrations, an influence on track crossing due to the eccentricity or vibrations is countervailed, and thus the direction in which the information disk apparatus is installed is accurately detected at all times.

According to the thirty-third aspect of the present invention, in the information disk apparatus installing direction detection method as defined in any of the nineteenth, twenty-second, twenty-eighth and twenty-ninth aspects, the driving means is installed so that it can be driven with an inclination with respect to the gravity direction in at least one of directions in which the information disk apparatus is installed. Therefore, it is possible to provide an information disk apparatus installing direction detection method by which a direction in which the reading means is driven can be judged as one of three directions, i.e., upward and downward directions when the information disk apparatus is installed vertically and the information disk is ejected in the lateral direction, and a horizontal direction when the information disk apparatus is installed horizontally.

According to a thirty-fourth aspect of the present invention, in the information disk apparatus installing direction detection method as defined in the thirty-third aspect, the inclination with respect to the gravity direction is between 15° and 75° or 105° and 165°. Therefore, it is possible to provide an information disk apparatus installing direction detection method by which a direction in which the reading means is driven can be judged as one of three directions, i.e., upward and downward directions when the information disk apparatus is installed vertically and the information disk is ejected in the lateral direction, and a horizontal direction when the information disk apparatus is installed horizontally.

According to a thirty-fifth aspect of the present invention, in the information disk apparatus installing direction detection method as defined in the thirty-third aspect, the inclination with respect to the gravity direction is not approximately equal to any of 45°, 90°, 135°, and 180°. Therefore, it is possible to provide an information disk apparatus installing direction detection method by which a direction in which the reading means is driven can be judged as one of five directions, i.e., upward and downward directions when the information disk apparatus is installed vertically and the information disk is ejected in the lateral direction, upward and downward directions when the information disk apparatus is installed vertically and the information disk is ejected in the vertical direction, and a horizontal direction when the information disk apparatus is installed horizontally.

According to a thirty-sixth aspect of the present invention, in the information disk apparatus installing direction detection method as defined in the thirty-third aspect, the inclination with respect to the gravity direction in the information disk device between 15° and 30°, 60° and 75°, 105° and 120°, or 150° and 165°. Therefore, it is possible to provide an information disk apparatus installing direction detection method by which a direction in which the reading means is driven can be judged as one of five directions, i.e., upward and downward directions when the information disk apparatus is installed vertically and the information disk is ejected in the lateral direction, upward and downward directions when the information disk apparatus is installed vertically and the information disk is ejected in the vertical direction, and a horizontal direction when the information disk apparatus is installed horizontally.

BEST MODE TO EXECUTE THE INVENTION

Embodiment 1

According to the first embodiment, the number of track crossings is measured when a reading means is driven in a direction corresponding to the radius of a disk mounted on an information disk apparatus, for a predetermined period of time, and the direction in which the information disk apparatus is installed is judged on the basis of this measured value, whereby the direction in which the information disk apparatus is installed is judged without employing a sensor means.

Hereinafter, the first embodiment according to the present invention will be described with reference to FIG. 1.

Figure 1:
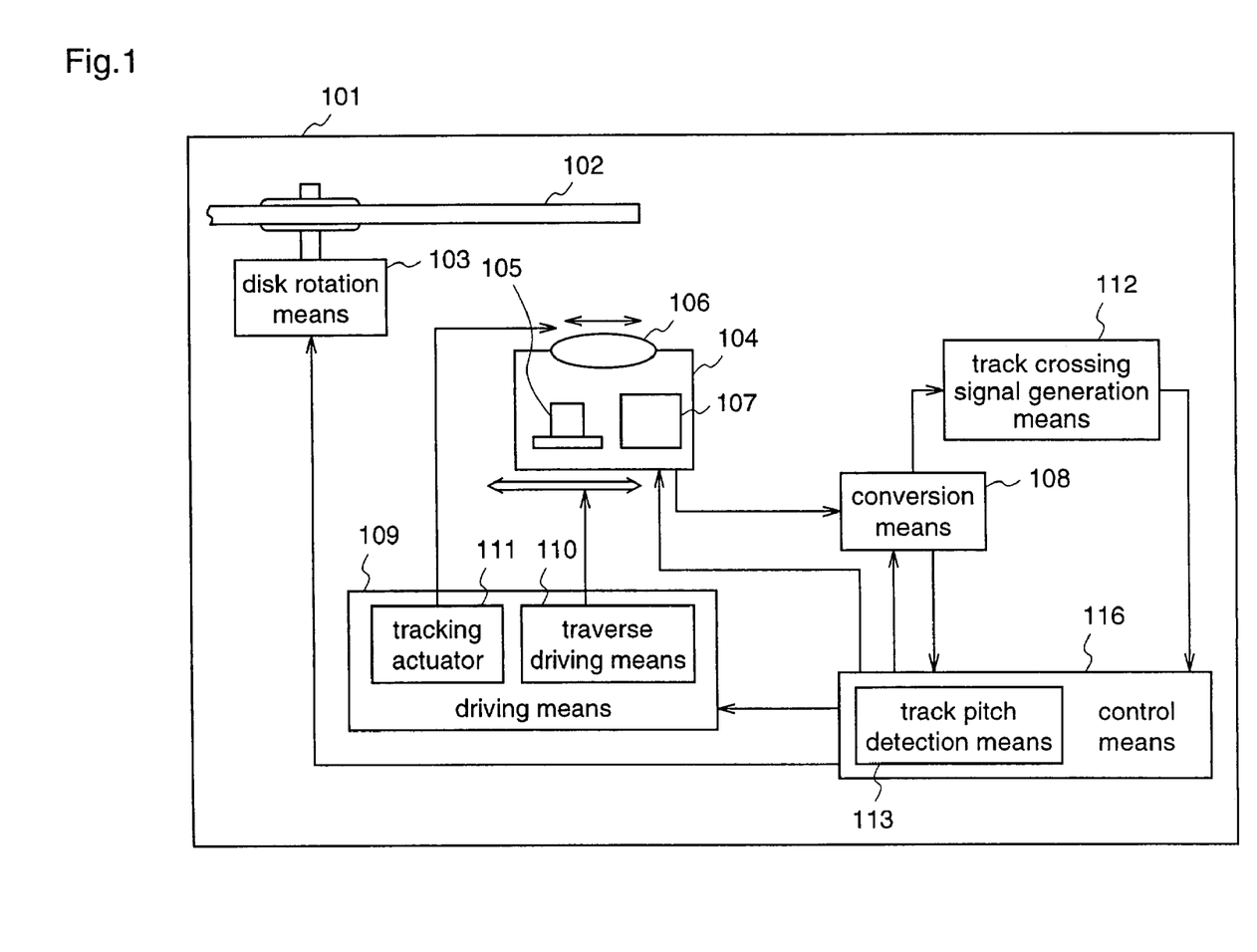
FIG. 1 is a block diagram illustrating a construction of a DVD-ROM player as an example of an information disk apparatus according to first and second embodiments of the present invention.

FIG. 1 is a block diagram when the present invention is applied to a DVD-ROM player.

In FIG. 1, a DVD-ROM player (information disk apparatus) 101 is able to play back various types of optical disks, in addition to a primary DVD-ROM, as optical disks (information disks) 102.

The DVD-ROM player shown in this first embodiment is able to play back disks such as CD-ROMs (CD-ROM, CD-R, and CD-RW), DVD-ROMs (DVD-5, DVD-9, and DVD-R4.7G), and DVD-R3.9Gs. Standard track pitches of the respective disks are as follows.

| CD-ROM | 1.6 μm |
| DVD-ROM | 0.74 μm |
| DVD-R3.9G | 0.80 μm. |

Numeral 103 denotes a disk rotation means for rotating the optical disk 102 which is mounted on the DVD-ROM player 101, at a prescribed speed. Numeral 104 denotes a reading means for reading a data signal from the optical disk 102. In the DVD-ROM player, for example, the reading means 104 is constituted by an element 105 which emits two lasers with different oscillation wavelengths for CD-ROMs and DVD-ROMs, an object lens 106 for condensing the laser beams, and a light detecting element 107 of two systems for CD-ROMs and DVD-ROMs. Numeral 108 denotes a conversion means which amplifies the output from the light detecting element 107, selects an output signal from the light detecting element according to the type of the optical disk, generates a tracking error (TE), a focus error (FE), a reproduction signal (RF), an ALL Sum signal (AS), an RF envelope signal (RFENV) and the like, and outputs those signals, thereby converting the reproduction signal of the optical disk 102 into digital data.

Numeral 109 denotes a driving means for moving the reading means 104 in a direction corresponding to the radius of the optical disk 102. The driving means 109 comprises, for example, two means: a traverse driving means 110 for driving the entire reading means 104 in the direction of the radius of the optical disk, and a tracking actuator 111 for driving the object lens 106 provided in the reading means 104 in the radial direction to finally drive the object lens 106 in the radial direction of the optical disk 102. Numeral 112 denotes a track crossing signal generation means which generates an information track crossing signal on the basis of a reproduction signal when a laser beam emitted from the reading means 104 crosses tracks which are formed on the optical disk. The information track crossing signal is generated by a method for binarizing a tracking error signal outputted from the reading means 104 with a hysteresis comparator or a comparator, by a method for comparing phases of the binarized signal and a not-on-track signal, which is generated from an envelope of the RF signal, with each other, to detect the movement direction, or the like.

Numeral 113 denotes a track pitch detection means for detecting a track pitch of the information disk. As a method for detecting the track pitch, there is a method, for example, in which the type of the information disk is judged, and a standard value of the track pitch corresponding to the judged disk type is used as a detection value.

Usually, since the DVD-ROM player 101 is able to play back data from various types of information disks as described above, and requires different light sources and detection signal generation methods according to the types of the disk, the DVD-ROM player 101 initially judges the type of the mounted disk by various kinds of methods. The judgement is made as follows. A judgement is made as to whether the disk is a disk of ROM type (CD-ROM, CD-R, DVD-ROM, or DVD-R) or a re-writable type disk (CD-RW) from the reflectance of the information disk, on the basis of the amplitude of a focus error signal at focus search, by employing, for example, a laser for CDs, and a judgement is further made as to whether the disk is a DVD type disk or a CD type disk from a degree of modulation of the RF signal, to select a required light source and signal path. Finally, it is checked whether TOC (TOP OF CONTENTS) data can be read from the information disk or not, and whether the selected disk type is correct or not from the TOC information. Then, a standard value of a track pitch corresponding to the disk type is selected.

As another method for calculating the track pitch, there is a method in which a linear speed detection means for detecting a linear speed of the optical disk 102 and a playback speed detection means for detecting the current playback speed of the optical disk 102 are provided in the track pitch detection means 113, the type of the optical disk 102 is detected, the linear speed of the disk is detected by employing the linear speed detection means, the information disk mounted on the disk rotation means 103 is rotated at a prescribed speed, the reading means 104 is moved to a position corresponding to a prescribed address (hereinafter, referred to simply as an "address") by driving the driving means 109, and a playback speed at the prescribed rotational speed and at the prescribed address is detected by employing the playback speed detection means, thereby calculating a track pitch of the information disk from the linear speed of the optical disk which is detected by the linear speed detection means, the playback speed detected at the prescribed rotational speed and address, the prescribed rotational speed, the address value, the innermost circumference diameter in a data area inherent in the detected disk type, and a data rate value when the playback is carried out at a prescribed reproduction speed inherent in the disk type. Numeral 116 denotes a control means (i.e., a controller) which receives signals from the conversion means 108 and the track crossing signal generation means 112 to process those signals, as well as controls the disk rotation means 103, the reading means 104, the conversion means 108, and the driving means 109.

Next, the operation of the control means 116 detecting the direction in which the DVD-ROM player 101 is installed will be described with reference to a flowchart in FIG. 2.

Figure 2:
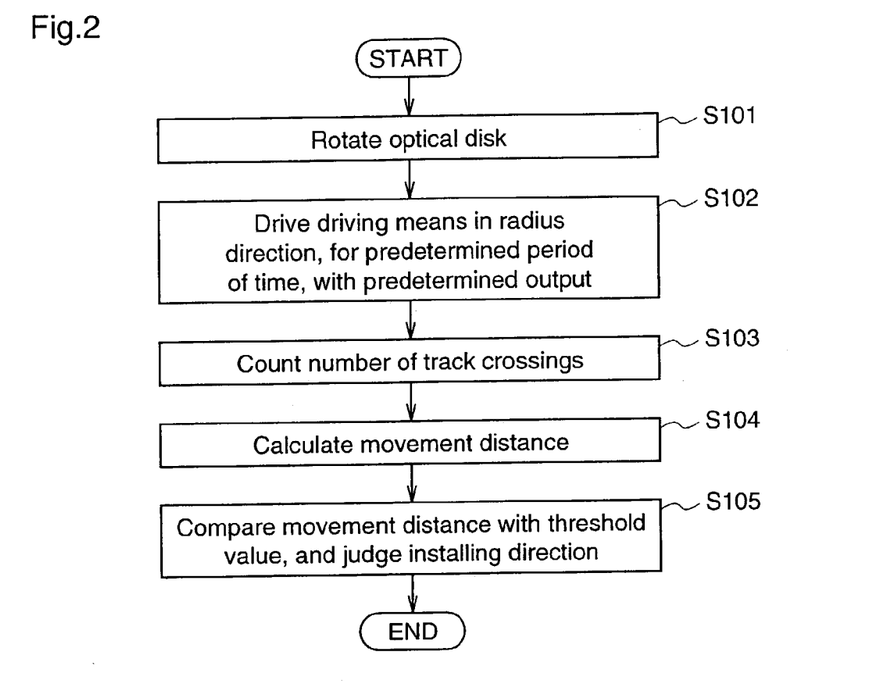
FIG. 2 is a flowchart illustrating an example of an operation of a control means in the information disk apparatus according to the first embodiment of the invention.

At startup of the DVD-ROM player 101, the drive control means 116 controls the disk rotation means 103, whereby the optical disk 102 is rotated (step S101 in FIG. 2). Then, the control means 116 drives the driving means 109 in the direction of the radius of the optical disk 102 for a predetermined period of time with predetermined output, i.e., at a predetermined speed (step S102), so as to move the reading means 104, and counts the number of track crossings, which is the number of times that tracks are intersected at right angles by the locus of the driving means 109, on the basis of the output signal from the track crossing signal generation means 112 while the driving means 109 is driven (step S103). A distance for which the reading means 104 is moved can be calculated by multiplying the number of track crossings by a measurement value of the track pitch detection means 113 (step S104). Naturally, the same effect is also obtained even when the number of track crossings is multiplied by a ratio of the measurement value to a track pitch of a standard disk, or a value proportional to that ratio.

Next, the control means 116 compares the obtained movement distance with a prepared threshold value, thereby judging the direction in which the DVD-ROM player 101 is installed (step S105). There are three directions that can be judged as direction in which the driving means 109 is movable: the horizontal direction in the case of horizontal installation, i.e., when the information disk apparatus is installed horizontally, and the upward and downward directions when the information disk apparatus is installed vertically. In the case of vertical installation, the device is not necessarily required to be installed in the accurately vertical direction, and the detection can be similarly performed even when the device is installed in the directions somewhat inclined from the accurately vertical direction.

A method for deciding the threshold value is as follows. The direction in which the driving means 109 is movable is previously set horizontal with respect to the gravity direction, and the above-described movement distance is measured. Then, a threshold value for the measured movement distance is decided by taking into consideration a change in the movement distance due to gravitational acceleration, the coefficient of friction of the driving means 109 and variations thereof, and the like, when the direction in which the driving means 109 is movable is set perpendicular to the gravity direction.

When the above-mentioned movement distance in cases where the direction in which the driving means 109 is movable is horizontal is within a predetermined range, it is judged that the information disk apparatus is installed in the horizontal direction. In cases where the reading means is moved from the outer circumference of the disk toward the inner circumference, when the movement distance is smaller than the predetermined range, it is judged that the information disk apparatus is installed so that the inner circumference direction of the disk is upward. On the other hand, when the movement distance is larger than the predetermined range, it is judged that the information disk apparatus is installed so that the inner circumference direction of the disk is downward. Further, it is also possible to detect an approximate angle of inclination of the driving means 109 with respect to the gravity direction, on the basis of the movement distance.

As described above, according to the first embodiment, a distance which the reading means is moved is calculated on the basis of the number of track crossings and the track pitch of the disk, and the calculated movement distance is compared with a threshold value, whereby the installing direction is detected merely by arithmetic operations. Therefore, three installing directions, that is, the horizontal direction when the information disk apparatus is installed horizontally, and the upward and downward directions when the information disk apparatus is installed vertically, can be detected without requiring a sensor so that problems of cost increases due to the provision of the sensor, or a space for setting the sensor do not occur.

While in the first embodiment the movement distance is calculated on the basis of the number of track crossings and the track pitch of the disk, and the calculated movement distance is compared with a threshold value, it is also possible that only the number of track crossings is employed and a threshold value is prepared for each type of the disk.

Further, while in the first embodiment the driving means 109 is moved in the radial direction for a predetermined period of time with predetermined output, while the number of track crossing is counted from an output signal from the track crossing signal generation means 112, a time until the predetermined number of track crossings may be counted.

Furthermore, in the first embodiment the DVD-ROM player is employed as an information disk apparatus, while a DVD-RAM drive, a DVD-R drive, a DVD-RW drive, a DVD+R drive, a DVD+RW drive, a CD-R drive, a CD-RW drive, and further a writable information disk apparatus such as a hard disk drive are also available.

As described above, according to the first embodiment, the direction in which the information disk apparatus is installed is detected on the basis of the track crossing count value when the reading means is moved in the radial direction for a predetermined period of time, whereby no additional sensor, circuit or the like is required, and the direction in which the information disk apparatus is installed is accurately detected at all times.

Embodiment 2

According to the second embodiment, the number of track crossings is measured when a reading means is reciprocated in the radial direction of an information disk apparatus, from the inner circumference toward the outer circumference as well as from the outer circumference toward the inner circumference, for a predetermined period of time, and the direction in which the information disk apparatus is installed is judged on the basis of the measured track crossing value, whereby the direction in which the information disk apparatus is installed is judged without employing a sensor means.

Hereinafter, the second embodiment according to the present invention will be described with reference to FIG. 1.

FIG. 1 is a block diagram when the present invention is applied to a DVD-ROM player.

Descriptions of the same or corresponding constituents in FIG. 1 as those described for the first embodiment will be omitted to avoid duplication.

Next, the operation of the control means 116 detecting the direction in which the DVD-ROM player 101 is installed will be described with reference to a flowchart in FIG. 3.

Figure 3:
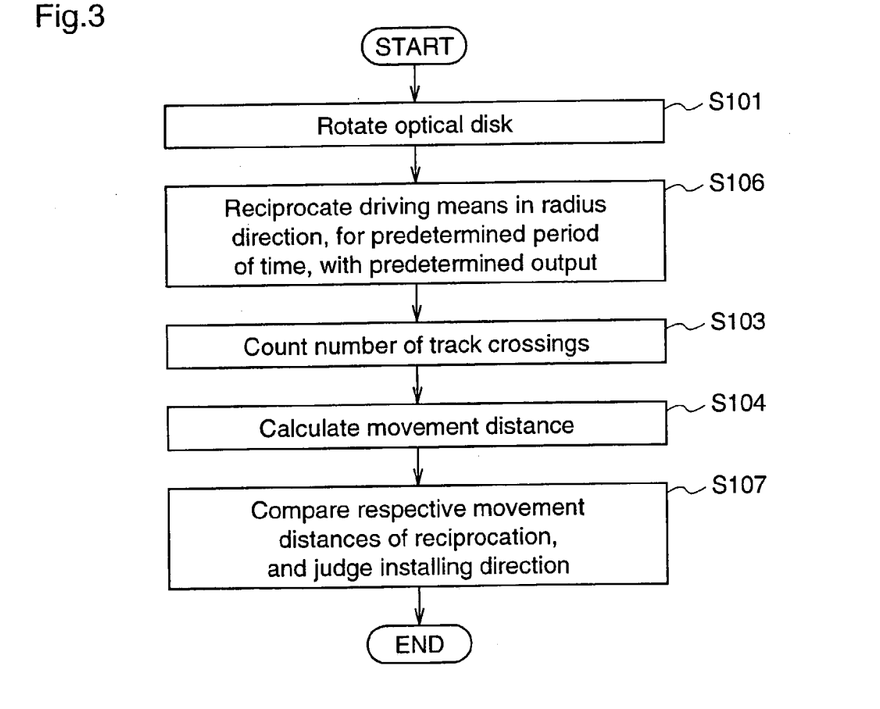
FIG. 3 is a flowchart illustrating an example of an operation of a control means in the information disk apparatus according to the second embodiment of the invention.

The control means 116 controls the disk rotation means 103, whereby the optical disk 102 is rotated (step S101 in FIG. 3). Then, the control means 116 drives the driving means 109 in the direction corresponding to the radius of the optical disk 102 for a predetermined period of time with predetermined output, i.e., at a predetermined speed (step S106), so as to move the reading means 104 from the inner circumference toward the outer circumference and, then, from the outer circumference toward the inner circumference. Then, the control means 116 counts the number of track crossings from the output signal of the track crossing signal generation means 112, with respect to each direction, during the reciprocation (step S103). A distance for which the reading means 104 is moved is calculated by multiplying the number of track crossings by a measurement value of the track pitch detection means 113 (step S104). Naturally, the same effect is obtained even when the number of track crossings is multiplied by a ratio of the measurement value to a track pitch of a standard disk, or a value proportional to that ratio. Then, the respective movement distances obtained for the reciprocation are compared with each other, whereby the direction in which the DVD-ROM player is installed is judged (step S107). As a method for the judgement, there is a method in which a difference between the respective movement distances of the reciprocation is obtained to compare the obtained difference with a prepared threshold value, a method in which a ratio between the respective movement distances of the reciprocation is obtained to compare the obtained ratio with a prepared threshold value, or the like.

While in the second embodiment the movement distance is calculated on the basis of the number of track crossings and the track pitch of the disk, and the calculated movement distance is compared with a threshold value, it is also possible that only the number of track crossings is employed and a threshold value is prepared for each type of the disk. Specifically, when a ratio between the respective movement distances of the reciprocation is compared with a threshold value, there is no need of preparing a threshold value for each type of the disk even when the track pitch is not employed, because the track pitch is independent of a detected value.

Further, in the second embodiment the driving means 109 is reciprocated in the radial direction for a predetermined period of time with predetermined output, and the number of track crossings is counted from an output signal of the track crossing signal generation means 112 during the reciprocation, while the number of track crossings can be also counted by reciprocally measuring a time until the predetermined number of track crossings is counted to compare these measured values with each other.

Furthermore, in the second embodiment the DVD-ROM player is employed as an information disk apparatus, while a DVD-RAM drive, a DVD-R drive, a DVD-RW drive, a DVD+R drive, a DVD+RW drive, a CD-R drive, a CD-RW drive, and further a writable information disk apparatus such as a hard disk drive are also available.

As described above, according to the second embodiment, the direction in which the information disk apparatus is installed is detected on the basis of the track crossing count value when the reading means is moved from the inner circumference of the information disk toward the outer circumference as well as from the outer circumference toward the inner circumference for a predetermined period of time with predetermined output, whereby the direction in which the information disk apparatus is installed is accurately detected at all times even when there is a wide range of variations of loads on the driving means.

Embodiment 3

According to the third embodiment, a reading means is driven according to a disk rotation cycle so that the reading means is located at the same rotational position at start and end of the movement, whereby the direction in which an information disk apparatus is installed is accurately detected at all times even when there is significant eccentricity between an information disk and a disk rotation means or vibrations.

Hereinafter, the third embodiment according to the present invention will be described with reference to FIG. 4.

Figure 4:
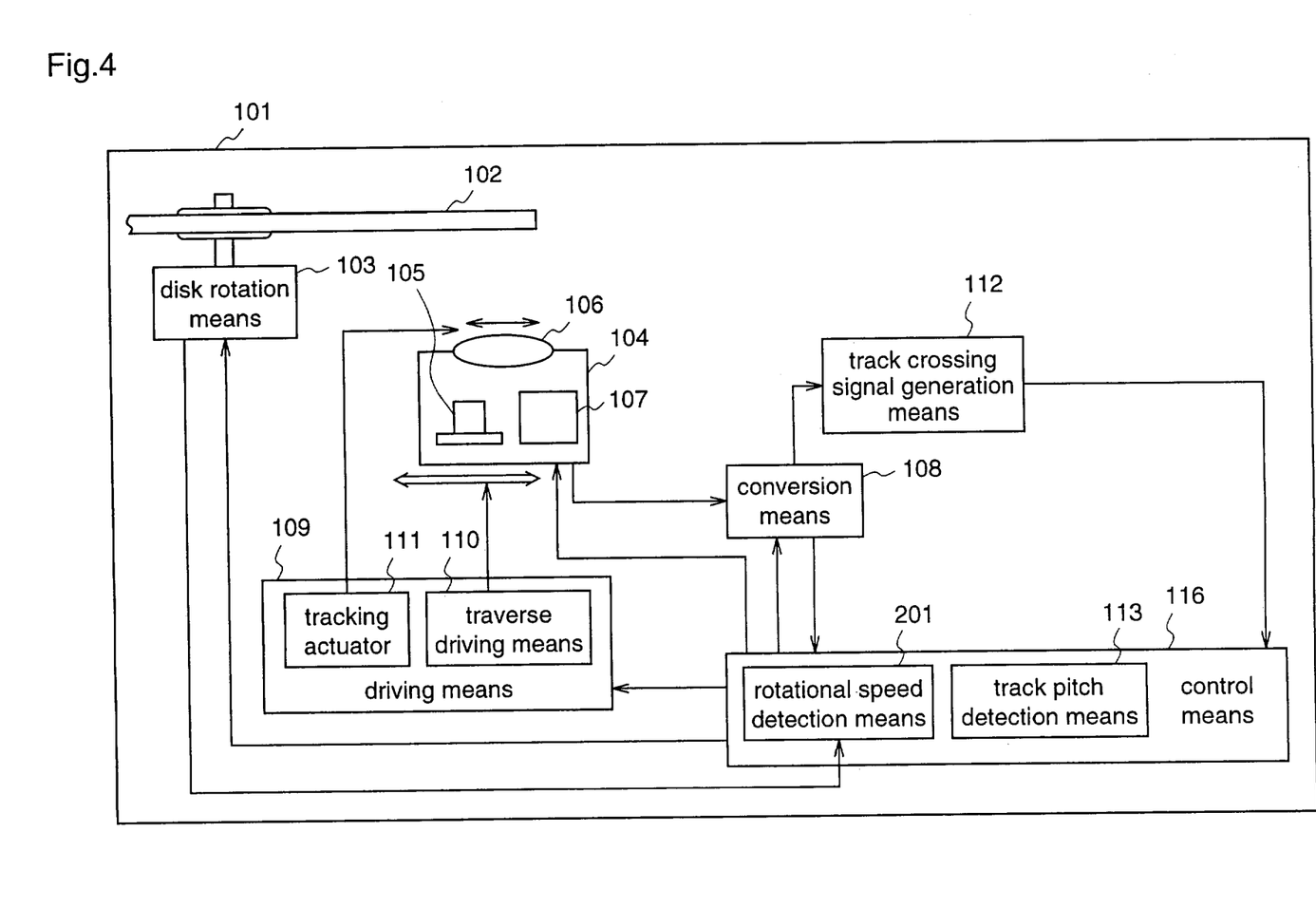
FIG. 4 is a block diagram illustrating a construction of a DVD-ROM player as an example of an information disk apparatus according to a third embodiment of the present invention.

FIG. 4 is a block diagram when the present invention is applied to a DVD-ROM player.

Descriptions of the same or corresponding constituents in FIG. 4 as those described for the first embodiment will be omitted to avoid duplication.

In FIG. 4, numeral 201 denotes a rotational speed detection means. The rotational speed detection means 201 detects a rotational speed of a disk on the basis of disk rotation information which is outputted from the disk rotation means 103. For example, when a brushless motor which is provided with a hall element as a rotation sensor is used as the disk rotation means, an output signal from the hall element is the disk rotation information. When the motor comprises three poles, six pulses are outputted per rotation, so that the rotational speed detection means detects the present disk rotational speed on the basis of these pulses.

Next, the operation of the control means 116 detecting the direction in which the DVD-ROM player 101 is installed will be described with reference to a flowchart in FIG. 5.

Figure 5:
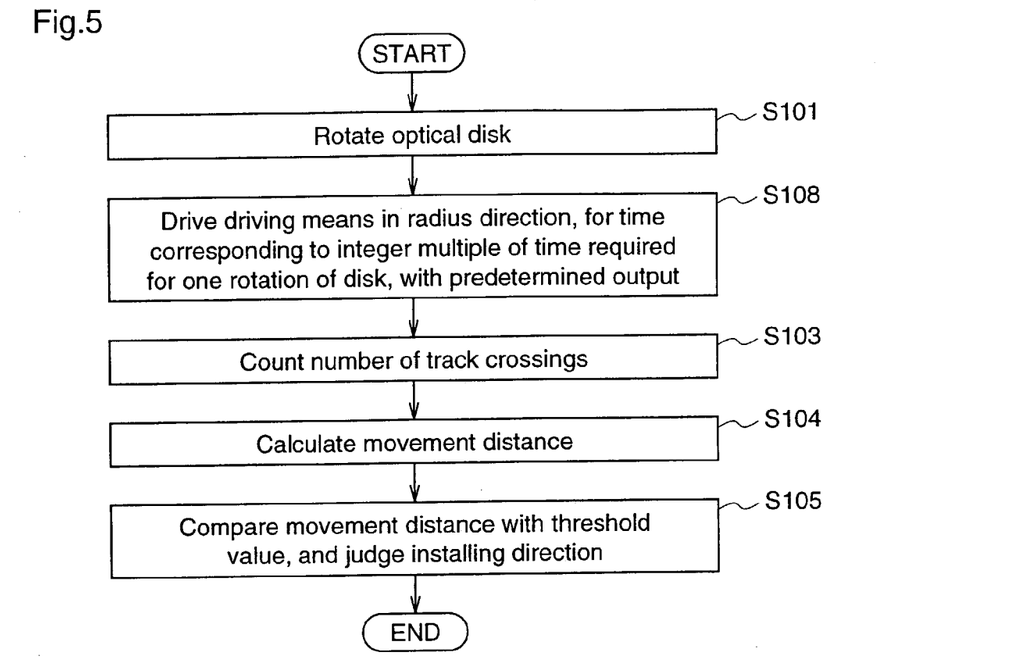
FIG. 5 is a flowchart illustrating an example of an operation of a control means in the information disk apparatus according to the third embodiment of the invention, as an example.

The control means 116 controls the disk rotation means 103, whereby the optical disk 102 is rotated (step S101 in FIG. 5). Then, the control means 116 drives the driving means 109 in the radial direction for a predetermined period of time with predetermined output, i.e., at a predetermined speed (step S108), while counting the number of track crossings on the basis of the output signal from the track crossing signal generation means 112 while the driving means 109 is driven (step S103). At this time, it is assumed that the time for driving the driving means in the radial direction is an integer multiple of the time required for one rotation of the disk at the rotational speed detected by the rotational speed detection means. Therefore, even when there is eccentricity or vibrations on the disk, the rotational positions on the disk at start and end of measurement of the number of track crossings are in accord, whereby influences on track crossing due to the eccentricity or vibrations can be eliminated. Next, a movement distance can be calculated by multiplying the number of track crossings by a measurement value of the track pitch detection means 113 (step S104). Naturally, the same effect is obtained even when the number of track crossings is multiplied by a ratio of the measurement value to a track pitch of a standard disk, or a value proportional to that ratio.

Thereafter, the direction in which the DVD-ROM player is installed is judged in a like manner as described for the first or second embodiment (step S105 in FIG. 5).

Figure 6:
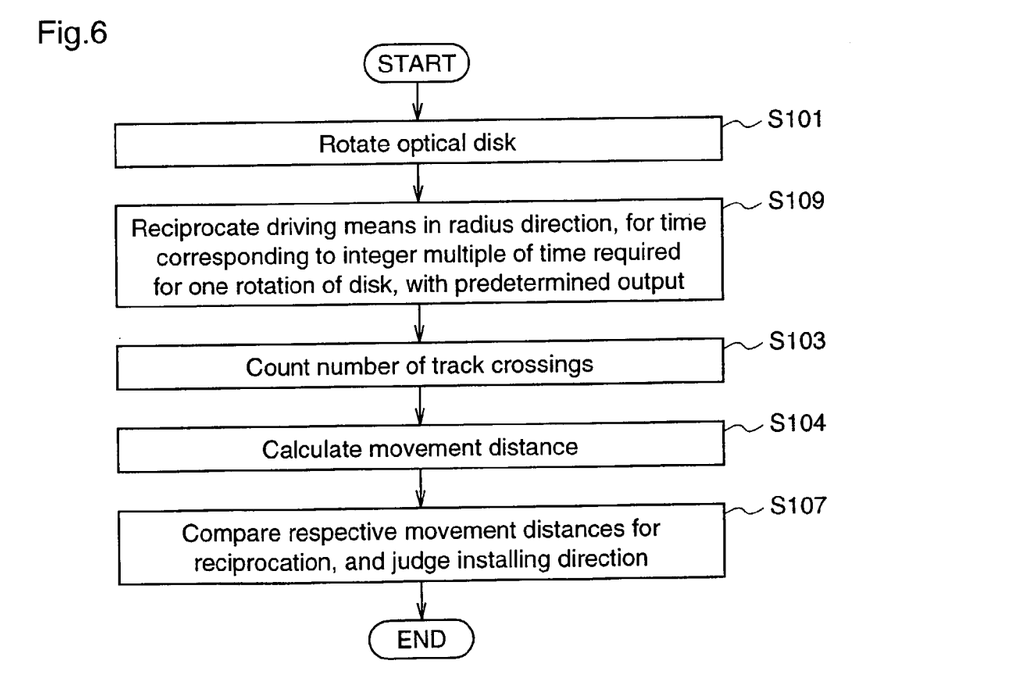
FIG. 6 is a flowchart illustrating an example of an operation of the control means in the information disk apparatus according to the third embodiment of the invention.

While in the above description the driving means 109 is driven in the direction of the radius of the optical disk 102 for a predetermined period of time with predetermined output, i.e., at a predetermined speed, as described for the first embodiment, the driving means may be reciprocated as shown in the flowchart in FIG. 6. In the flowchart in FIG. 6, step S109 is a step of reciprocating the driving means in the direction of the radius of the information disk with predetermined output for a time corresponding to an integer multiple of the time required for one rotation of the disk, and step S107 is a step of comparing respective movement distances of the reciprocation with each other to judge the direction in which the DVD-ROM player is installed.

Further, while in the third embodiment the time required for one rotation of the disk is obtained on the basis of the disk rotational speed, the same effect can be similarly obtained by setting a driving time so that the disk rotational positions at start and end of the measurement are in accord.

As described above, according to the third embodiment, the reading means is driven according to a cycle of disk rotation so that it is located at the same rotation position at start and end of the driving, whereby, even when there is significant eccentricity between the information disk and the disk rotation means or vibrations, an influence on the track crossing due to the eccentricity or vibrations is countervailed, and therefore the direction in which the information disk apparatus is installed is accurately detected at all times.

While also in the third embodiment the movement distance is calculated on the basis of the number of track crossings and the track pitch of the disk to compare the calculated movement distance with a threshold value, it is also possible that only the number of track crossings is employed and a threshold value is prepared for each type of the disk.

Further, while also in the third embodiment the driving means 109 is driven in the radial direction for a predetermined period of time with predetermined output, and the number of track crossings is counted on the basis of an output signal from the track crossing signal generation means 112 while the driving means is driven, the same effect can be similarly obtained by measuring a time until the predetermined number of track crossings is counted.

Furthermore, also in the third embodiment the DVD-ROM player is employed as an information disk apparatus, while a DVD-RAM drive, a DVD-R drive, a DVD-RW drive, a DVD+R drive, a DVD+RW drive, a CD-R drive, a CD-RW drive, and further a writable information disk apparatus such as a hard disk drive are also available.

Embodiment 4

According to the fourth embodiment, a reading means which is installed in an information disk apparatus to be inclined with respect to the gravity direction is driven by a driving means in the direction of the radius of an information disk, whereby the direction in which the information disk apparatus is installed is detected.

Hereinafter, the fourth embodiment will be described with reference to FIGS. 7, 9, and 10.

FIG. 1 is a block diagram when the present invention is applied to a DVD-ROM player.

Descriptions the constituents in FIG. 1 that operate in like manners as those described for the first embodiment will be omitted of to avoid duplication.

Figure 7:
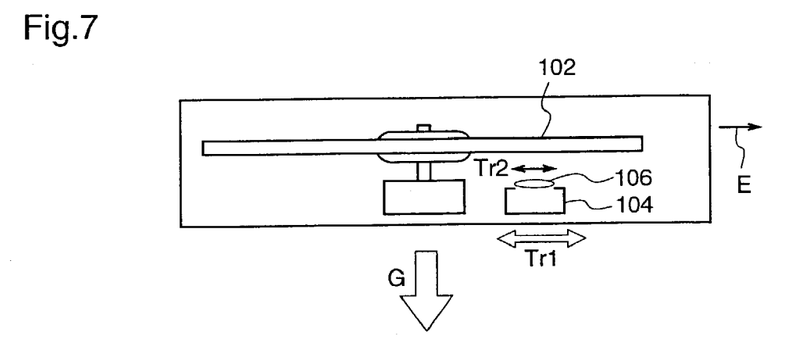
FIG. 7 is a diagram illustrating a driving direction when an information disk apparatus according to a fourth embodiment of the present invention is horizontally installed.

FIG. 7 is a diagram illustrating a driving direction Tr1 when the information disk apparatus according to the present invention is installed horizontally. In the drawing, the driving means 109 is driven in the direction perpendicular (90°) to the gravity direction G.

Figure 9:
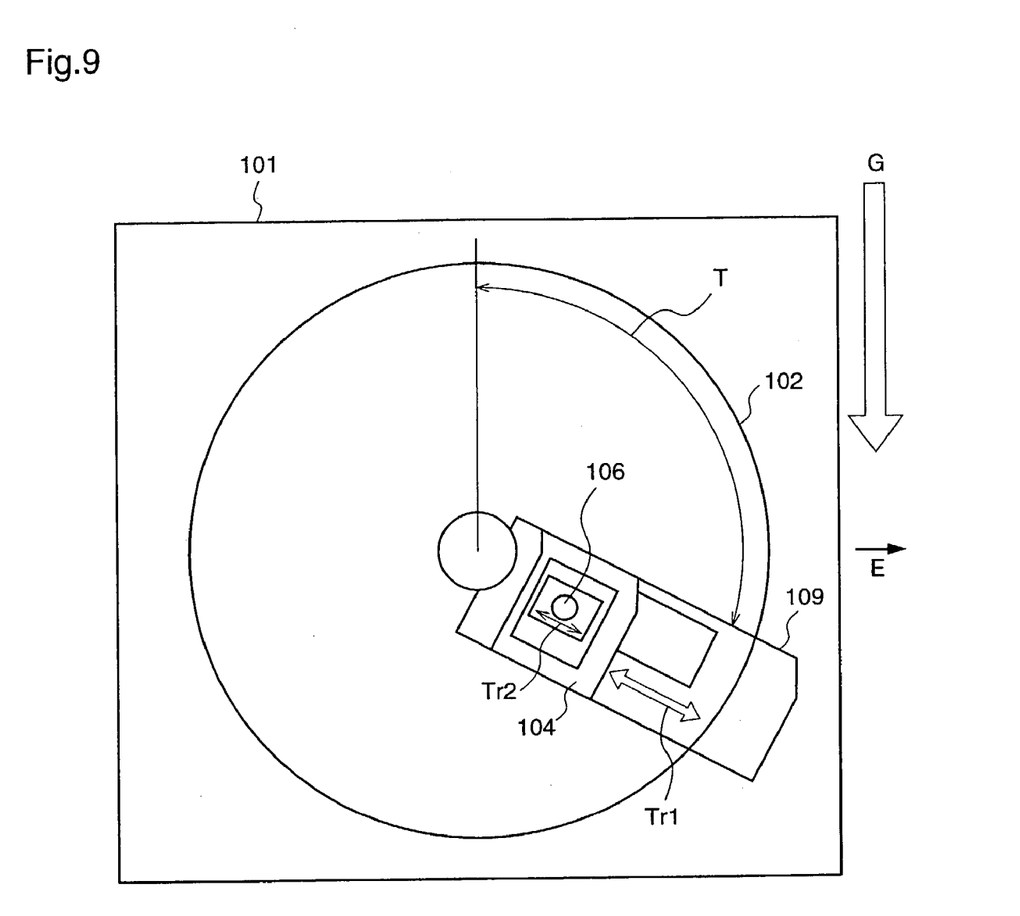
FIG. 9 is a diagram illustrating a driving direction when an information disk apparatus according to a fifth embodiment of the present invention is installed vertically so that a disk is ejected in the lateral direction.

FIG. 9 is a diagram illustrating a first driving direction for the driving means when the information disk apparatus is installed vertically and the disk ejection direction E is a lateral direction. In the drawing, the driving means 109 is driven diagonally downward with respect to the gravity direction G.

Figure 10:
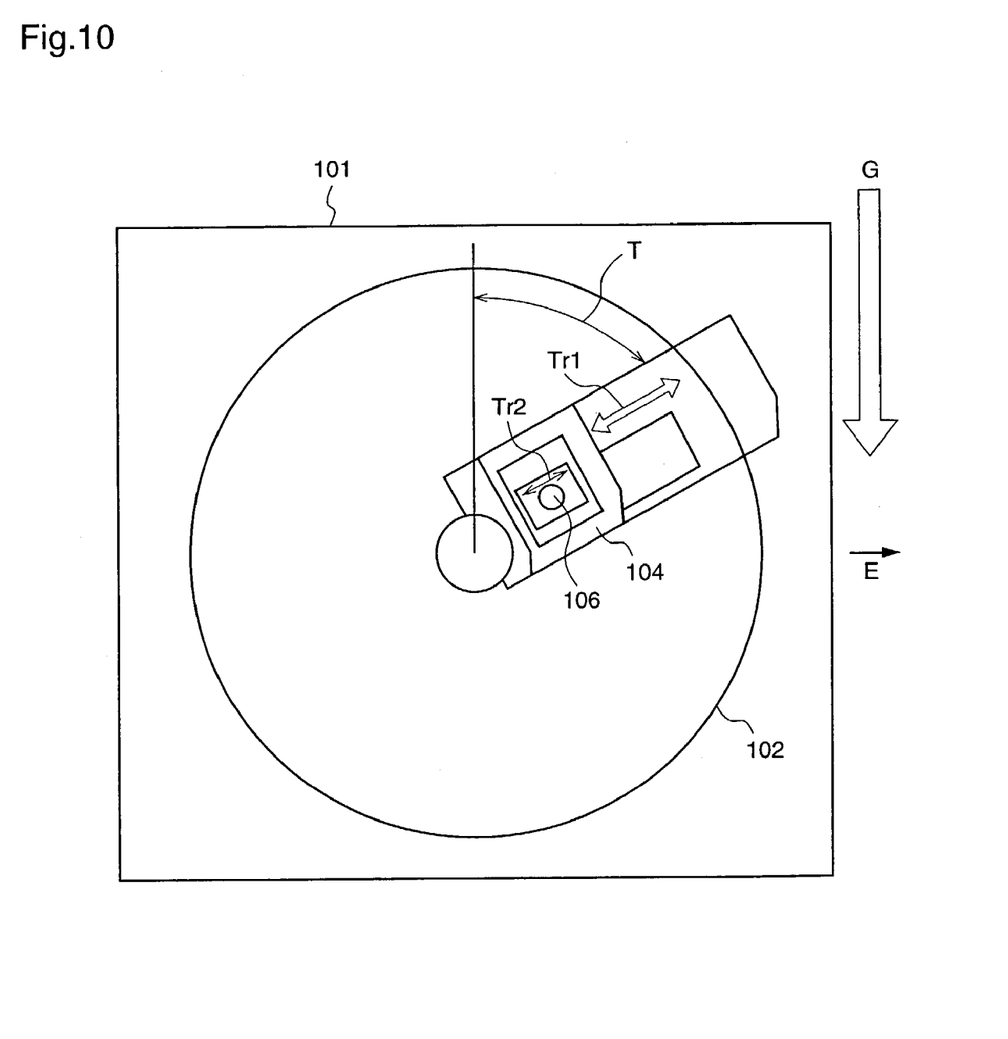
FIG. 10 is a diagram illustrating another driving direction when the information disk apparatus according to the fifth embodiment of the invention is installed vertically so that the disk is ejected in the lateral direction.

FIG. 10 is a diagram illustrating a second driving direction for the driving means when the information disk apparatus is installed vertically so that the disk ejection direction E is a horizontal direction. In the drawing, the driving means 109 is driven diagonally upward with respect to the gravity direction.

Next, the operation of the control means 116 detecting the direction in which the DVD-ROM player 101 is installed will be described. The control means 116 controls the disk rotation means 103 to rotate the optical disk 102. Then, the control means 116 reciprocates the driving means 109 in the radial direction for a predetermined period of time with predetermined output, and counts the number of track crossings with respect to each direction, on the basis of the output signal from the track crossing signal generation means 112. At this time, the driving means 109 is not driven in the tracking direction Tr2. A distance for which the driving means 109 is moved is calculated by multiplying the number of track crossings by a measurement value of the track pitch detection means 113. Naturally, the same effect is obtained even when the number of track crossings is multiplied by a ratio of the measurement value to a track pitch of a standard disk, or a value proportional to that ratio. Further, the same effect can be achieved simply by the comparison of the number of track crossings. In the case of horizontal installation as shown in FIG. 3, the gravity scarcely affects the driving means 109 and only friction occurs, whereby the numbers of track crossings are almost equal for the to and fro movement.

On the other hand, when the driving means 109 is driven diagonally downward with respect to the gravity direction G as shown in FIG. 9, the gravity affects the driving means in the forward direction in cases where tracks are crossed from the inner circumference toward the outer circumference, and in the opposite direction in cases where the tracks are crossed from the outer circumference toward the inner circumference, so that the number of track crossings is larger in the cases where the tracks are crossed from the inner circumference toward the outer circumference.

When the driving means 109 is driven diagonally upward with respect to the gravity direction G as shown in FIG. 10, the number of track crossings is larger, on the contrary, in cases where the tracks are crossed from the outer circumference toward the inner circumference. Therefore, the direction in which the DVD-ROM player is installed can be judged on the basis of a difference or ratio between the numbers of track crossings.

It is preferable that the inclination of the driving means 109 to the gravity direction is 15° ~75° or 105°~165°. In most cases, a typical information disk apparatus is allowed to be installed with an inclination of approximately 0°~15° in a forward or backward, or rightward or leftward direction with respect to the normal installing direction, while even when the information disk apparatus is installed with some inclination, the same effect can be obtained when the angle of the inclination is set to an appropriate value within the above-described ranges.

As described above, according to the fourth embodiment, the reading means is reciprocated by the driving means in the direction of the radius of the information disk, and the direction in which the information disk apparatus is installed is judged on the basis of a difference between the numbers of track crossings detected during the reciprocation, whereby three installing directions can be judged without providing an additional sensor or the like. The three installing directions as directions in which the reading means is moved are upward and downward directions when the information disk apparatus is installed vertically and the information disk is ejected in the lateral direction, and the horizontal direction when the information disk apparatus is installed horizontally.

While in the fourth embodiment the driving means 109 is installed so that the direction in which the driving means 109 is driven is inclined with respect to the disk ejection direction, the same effect is achieved when the driving means 109 is installed so that the direction in which the driving means 109 is driven is inclined with respect to the gravity direction in the respective installing directions.

Embodiment 5

According to the fifth embodiment, a whole information disk apparatus which is installed so that a reading means is installed, being inclined with respect to the gravity direction, can detect a direction in which the information disk apparatus is installed with an inclination within the allowable range, by driving the reading means in the direction of the radius of an information disk by means of a driving means.

Hereinafter, the fifth embodiment will be described with reference to FIGS. 7, 8, 9, and 10.

FIG. 1 is a block diagram when the present invention is applied to a DVD-ROM player.

Descriptions of the constituents in FIG. 1 that operate in like manners as those described for the first embodiment will be omitted to avoid duplication.

FIG. 7 is a diagram illustrating the direction in which the driving means is driven when the information disk apparatus is installed horizontally. In the drawing, the driving means 109 is driven in the direction perpendicular (90°) to the gravity direction G.

Figure 8:
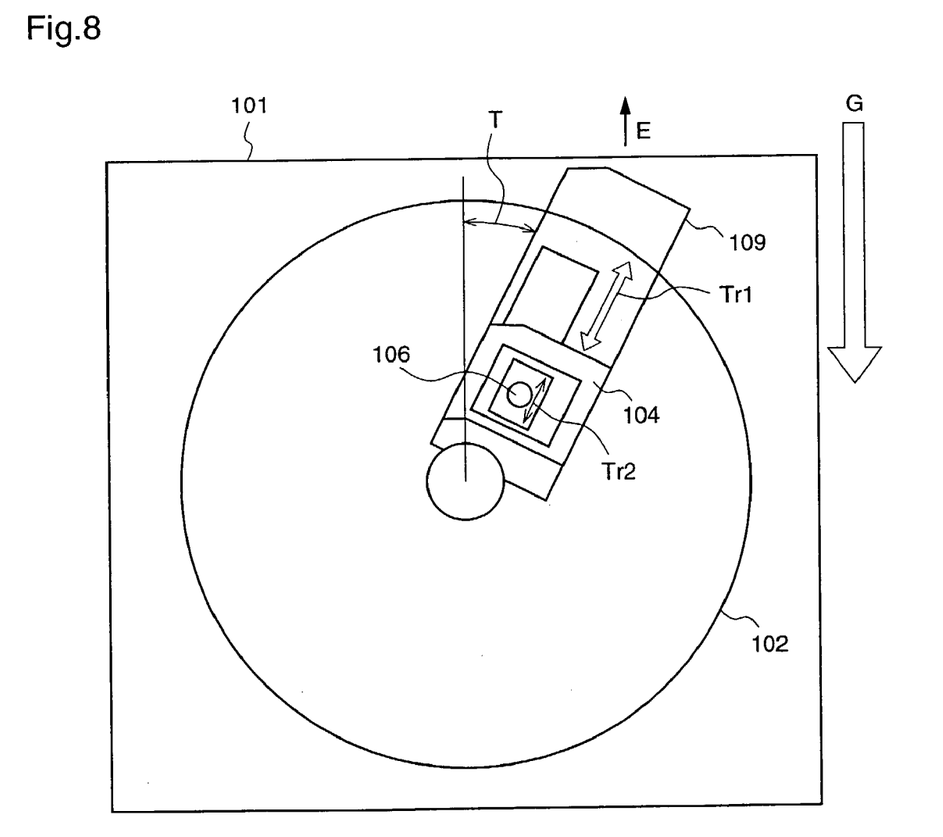
FIG. 8 is a diagram illustrating a driving direction when the information disk apparatus according to the fourth embodiment of the invention is installed so that a disk is ejected in the upward direction.

FIG. 8 is a diagram illustrating the driving direction when the information disk apparatus is installed vertically so that the disk ejection direction E is an upward direction. In the drawing, the driving means 109 is installed with an inclination of approximately 30° to the disk ejection direction E, and is driven with an inclination of approximately 30° with respect to the gravity direction G in the installing direction in FIG. 8.

FIG. 9 is a diagram illustrating a first driving direction when the information disk apparatus is installed vertically so that the disk ejection direction E is a lateral direction. In the drawing, the driving means 109 is driven with an inclination of approximately 120° with respect to the gravity direction G.

FIG. 10 is a diagram illustrating a second driving direction when the information disk apparatus is installed vertically so that the disk ejection direction E is a lateral direction. In the drawing, the driving means 109 is driven with an inclination of approximately 60° with respect to the gravity direction G.

Next, the operation of the control means 116 detecting the direction in which the DVD-ROM player 101 is installed will be described. The control means 116 controls the disk rotation means 103 to rotate the optical disk 102. Then, the control means 116 reciprocates the driving means 109 in the radial direction for a predetermined period of time with predetermined output, and counts the number of track crossings on the basis of the output signal from the track crossing signal generation means 112, with respect to each direction. A movement distance is calculated by multiplying the number of track crossings by a measurement value of the track pitch detection means 113. Naturally, the same effect is obtained even when the number of track crossings is multiplied by a ratio of the measurement value to a track pitch of a standard disk, or a value proportional to that ratio. Further, the same effect can be achieved simply by the comparison of the number of track crossings. In the case of horizontal installation as shown in FIG. 3, the gravity scarcely affects the driving means 109 and only friction included by the driving means 109 has influences, whereby the numbers of track crossings are almost equal for the to and fro movement.

On the other hand, when the information disk apparatus is installed so that the disk ejection direction E is an upper direction, and the driving means is driven with an inclination of approximately 30° with respect to the gravity direction G, as shown in FIG. 8, an influence of gravitational acceleration "g" exerted on the driving means 109 is obtained as follows.

$$a = g * \cos \phi \quad (1), \text{and}$$

since $\phi=30°$ ("*" indicates multiplication), $$a1 = 0.8666 * g \quad (2).$$

+86% of the gravitational acceleration "g" is applied in the direction from the outer circumference toward the inner circumference, and −86% of gravitational acceleration "g" is applied in the direction from the inner circumference toward the outer circumference, respectively.

In the first case where the information disk apparatus is installed vertically so that the disk ejection direction E is a lateral direction as shown in FIG. 9, when the driving means 109 is driven with an inclination of approximately 120° with respect to the gravity direction, an influence of the gravitational acceleration "g" exerted on the driving means 109 is obtained as follows. Assumed that $\phi=120°$ in the expression (1), $$a2 = -0.5 * g \quad (3) \text{ so that}$$

−50% of the gravitational acceleration "g" is applied in the direction from the outer circumference toward the inner circumference, and +50% of gravitational acceleration "g" is applied in the direction from the inner circumference toward the outer circumference, respectively.

In the second case where the information disk apparatus is installed vertically so that the disk ejection direction E is an upper direction as shown in FIG. 10, when the driving means 109 is driven with an inclination of approximately 60° with respect to the gravity direction, an influence of the gravitational acceleration "g" exerted on the driving means 109 is obtained as follows. Assumed that $\phi=60°$ in the expression (1), $$a3 = 0.5 * g \quad (4) \text{ so that}$$

+50% of the gravitational acceleration "g" is applied in the direction from the outer circumference toward the inner circumference, and −50% of gravitational acceleration "g" is applied in the direction from the inner circumference toward the outer circumference, respectively.

Accordingly, there occurs a difference between the numbers of track crossings when the driving means 109 is driven in the direction from the outer circumference toward the inner circumference and the number of track crossings in the direction from the inner circumference toward the outer circumference. Thus, by comparing the both numbers of track crossings, the following four installing directions can be judged.

That is, i) the horizontal installation when the both numbers of track crossings are almost equal to each other, ii) the first vertical installation, i.e., the information disk apparatus is installed vertically so that the disk is ejected in the lateral direction and the driving means is driven diagonally downward, when the number of track crossings from the inner circumference toward the outer circumference is larger, and iii) when the number of track crossings from the outer circumference toward the inner circumference is larger, from a ratio between the numbers of track crossings from the outer circumference toward the inner circumference and from the inner circumference toward the outer circumference, ① the second vertical installation, i.e., the information disk apparatus is installed vertically so that the disk is ejected in the lateral direction and the driving means is driven diagonally upward, or ② the information disk apparatus is installed vertically so that the disk is ejected in the upward direction. It is judged that the information disk apparatus is installed in either one of these states.

While in the fifth embodiment the driving means 109 is installed with an inclination of approximately 30° with respect to the disk ejection direction, the same effect can be achieved when the inclination with respect to the gravity direction is not approximately equal to any of 45°, 90°, 135°, and 180®. These angles 45°, 90°, 135°, and 180° are angels which do not cause a difference between the numbers of track crossings due to reciprocation and, thus, make it impossible to judge the installing direction.

In most cases, a typical information disk apparatus is allowed to be installed with the inclination of approximately 0°~15° with respect to the normal installing direction in the forward or backward, and rightward or leftward directions, while the same effect can be obtained by setting an angle of the inclination θ with respect to the gravity direction within one of the ranges 15°~30°, 60°~75°, 105°~120°, or 150°~165° even when the apparatus is installed with some inclination.

In this case, the expression (1) indicating the influence of the gravitational acceleration "g" exerted on the driving means 109 has to be changed as follows.

$$a = g * (\cos \phi) * (\cos \theta) \quad (5)$$

As described above, according to the fifth embodiment, the reading means is reciprocated by the driving means in the direction of the radius of the information disk, and the direction in which the information disk apparatus is installed is judged on the basis of a difference between the numbers of track crossings detected during the reciprocation, thereby detecting the direction in which the information disk apparatus is installed, in which apparatus the reading means is installed being inclined with respect to the gravity direction, and the whole information disk apparatus is installed with an inclination within the allowable range, without providing an additional sensor or the like.

In the fifth embodiment, the installing direction is selected from the four kinds of directions, i.e., the horizontal direction, the direction in which the information disk apparatus is installed vertically and the disk is ejected in the upward direction, the direction in which the information disk apparatus is installed vertically and the disk is ejected in the lateral direction as well as the driving means is driven diagonally upward, and the direction in which the information disk apparatus is installed vertically and the disk is ejected in the lateral direction as well as the driving means is driven diagonally downward. However, it is also possible to add a case where the disk is ejected in the downward direction.

While in the fifth embodiment the apparatus is installed so that the direction in which the driving means 109 is driven is inclined with respect to the disk ejection direction, the same effect is achieved when the driving means 109 is installed so that the direction in which the driving means 109 is driven is inclined with respect to the gravity direction in the respective installing directions.

APPLICABILITY IN INDUSTRY

As described above, according to an information disk apparatus and an information disk apparatus installing direction detection method of the present invention, a reading means is driven in the direction of the radius of an information disk, the number of track crossings is detected, and the direction in which the information disk apparatus is installed is judged on the basis of the detected number of track crossings. Thereby, it is possible to realize an information disk apparatus and an information disk apparatus installing direction detection method, that enable judgement of the installing direction without a cost increase caused by providing a sensor means and without requiring a place for setting the sensor means.

The invention claimed is:

1. An information disk apparatus for recording or reproducing information in/from an information disk on which information tracks are formed spirally or concentrically, the information disk apparatus comprising:
a controller operable to:
control a driving means for driving a reading means so that the driving means reciprocates the reading means for reading the information from the information disk during rotation of the information disk, in a direction corresponding to a radius of the information disk, and
calculate a number of track crossing times that the information tracks are crossed during the reciprocation, based on the information read by the reading means during the reciprocation, and judge a direction in which the information disk apparatus is installed based on a result of the calculation.

2. The information disk apparatus as defined in claim 1, wherein
the information disk is an optical disk,
the reading means is an optical pickup, and
the controller is operable to control the optical pickup to focus on an information recording surface of the optical disk at the reading of the information.

3. The information disk apparatus as defined in claim 2, wherein
the controller is operable to stop a tracking drive by the optical pickup at the reading of the information.

4. The information disk apparatus as defined in claim 1, further comprising a track crossing signal generation means for generating an information track crossing signal of the information disk, wherein
the driving means is set to be drivable at an inclination with respect to a direction of gravity in at least one of a number of directions in which the information disk apparatus is installable,
the driving means is operable to reciprocate the reading means in the direction corresponding to the radius of the information disk for a predetermined period of time, from an inner circumference of the information disk toward an outer circumference of the information disk and from the outer circumference toward the inner circumference, and count the information track crossing signal generated by the track crossing signal generation means during the reciprocation to obtain a count value, and
the controller is operable to judge the direction in which the information disk apparatus is installed based on the obtained count value.

5. The information disk apparatus as defined in claim 4, wherein
the inclination with respect to the direction of gravity is between 15° and 75° or 105° and 165°.

6. A method for detecting a direction of installation of an information disk apparatus that records or reproduces information in/from an information disk on which information tracks are formed spirally or concentrically, the information disk apparatus having a driving means for driving a reading means for reading the information from the information disk, the method comprising:
reciprocating the reading means for reading the information from the information disk during rotation of the information disk, in a direction corresponding to a radius of the information disk; and
obtaining a number of track crossing times that the information tracks are crossed during the reciprocating, based on the information read by the reading means during the reciprocating and thereby judging the direction in which the information disk apparatus is installed.

7. The method as defined in claim 6, wherein
the information disk is an optical disk,
the reading means is an optical pickup, and
the method further comprises controlling the optical pickup to focus on an information recording surface of the optical disk, at the reading of the information.

8. The method as defined in claim 7, further comprising stopping a tracking drive by the optical pickup at the reading of the information.

9. The method as defined in claim 6, wherein
the driving means is installed to be drivable at an inclination with respect to a direction of gravity in at least one of a number of directions in which the information disk apparatus is installable.

10. The method as defined in claim 9, wherein
the inclination with respect to the direction of gravity is between 15° and 75° or 105° and 165°.

* * * * *